(12) United States Patent
Cagno et al.

(10) Patent No.: US 7,870,374 B2
(45) Date of Patent: Jan. 11, 2011

(54) VALIDATING PHYSICAL AND LOGICAL SYSTEM CONNECTIVITY OF COMPONENTS IN A DATA PROCESSING SYSTEM

(75) Inventors: Brian James Cagno, Tucson, AZ (US); John Charles Elliott, Tucson, AZ (US); Kenny Nian Gan Qiu, Tucson, AZ (US); Donald Scott Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 11/862,593

(22) Filed: Sep. 27, 2007

(65) Prior Publication Data

US 2009/0089594 A1 Apr. 2, 2009

(51) Int. Cl.
*H04M 11/04* (2006.01)
(52) U.S. Cl. ............... 713/1; 713/300; 324/66; 340/310.11; 340/310.16; 340/310.17
(58) Field of Classification Search .......... 713/1, 713/300; 324/66; 340/310.11, 340.16, 340.17
See application file for complete search history.

(56) References Cited

U.S. PATENT DOCUMENTS

| | | | |
|---|---|---|---|
| 4,057,793 A | 11/1977 | Johnson et al. | |
| 4,218,655 A | 8/1980 | Johnston et al. | |
| 5,198,796 A | 3/1993 | Hessling, Jr. | |
| 5,205,318 A | 4/1993 | Massaro et al. | |
| 5,455,932 A | 10/1995 | Major et al. | |
| 6,154,488 A | 11/2000 | Hunt | |
| 6,188,973 B1 | 2/2001 | Martinez et al. | |
| 6,407,987 B1 | 6/2002 | Abraham | |
| 6,587,037 B1 | 7/2003 | Besser et al. | |
| 7,173,938 B1 | 2/2007 | Davidow | |
| 7,406,231 B1* | 7/2008 | Beck et al. ............. 385/100 |
| 7,502,669 B1* | 3/2009 | Evans et al. ............ 700/302 |
| 7,694,029 B2* | 4/2010 | Kubo et al. ............. 710/10 |
| 7,742,393 B2 | 6/2010 | Bonicatto et al. | |
| 7,774,633 B1 | 8/2010 | Harrenstien et al. | |
| 2004/0061486 A1* | 4/2004 | Peeke et al. ............ 324/66 |

(Continued)

OTHER PUBLICATIONS

U.S. Appl. No. 11/742,026, filed Apr. 30, 2007, Cagno et al.

(Continued)

*Primary Examiner*—Abdelmoniem Elamin
(74) *Attorney, Agent, or Firm*—Francis Lammes; Stephen J. Walder, Jr.; Randall J. Bluestone

(57) ABSTRACT

A mechanism is provided for validating a connection of powered elements within a data processing system. A request for data is issued to a set of powered elements using a set of communication channels. The set of communication channels comprises one or more alternating current power lines. The request is sent as a set of instructions injected onto the communication channels to the set of powered elements. Data received from the set of powered elements using the set of communication channels includes physical connection information for the set of powered elements. A determination is made as to whether each powered element in the set of powered elements is connected in a predetermined configuration. A notification is presented to a user identifying each powered element in the set of powered elements that is not connected in the predetermined configuration.

20 Claims, 9 Drawing Sheets

U.S. PATENT DOCUMENTS

2004/0233929 A1    11/2004    Hall et al.
2007/0101393 A1*   5/2007    Ito .............................. 725/132
2007/0154011 A1    7/2007    Yoshihara et al.
2008/0133047 A1*   6/2008    Best et al. ................... 700/215
2009/0204729 A1*   8/2009    Best et al. ..................... 710/16

OTHER PUBLICATIONS

U.S. Appl. No. 11/857,778, filed Sep. 19, 2007, Cagno et al.

"Automated Method for Physically Mapping HW Locations in a Data Center", IBM Corporation, Technical Disclosure, http://www.ip.com/pubview/IPCOM000, Nov. 14, 2006, 4 pages.

USPTO U.S. Appl. No. 11/742,026, Image File Wrapper printed Aug. 25, 2010, 1 page.

USPTO U.S. Appl. No. 11/857,778, Image File Wrapper printed Aug. 25, 2010, 1 page.

Office Action mailed on Sep. 1, 2010 for U.S. Appl. No. 11/742,026; 21 pages.

* cited by examiner

702 →

| ARCHITECTED CONNECTION 704 | EXPECTED PHYSICAL CONNECTION 705 | PHYSICAL INFORMATION 706 | CONDITION 710 | EXPECTED LOGICAL CONNECTION 707 | LOGICAL INFORMATION 708 | CONDITION 711 |
|---|---|---|---|---|---|---|
| 1A | PPCC 606 | PPCC OF POWERED ELEMENT 608 | ERROR | PCC 606 | PCC OF POWERED ELEMENT 606 | |
| 2A | PPCC 608 | PPCC OF POWERED ELEMENT 606 | ERROR | PCC 608 | PCC OF POWERED ELEMENT 608 | |
| 3A | PPCC 610 | PPCC OF POWERED ELEMENT 610 | | PCC 610 | PCC OF POWERED ELEMENT 610 | |
| 4A | PPCC 612 | RPCC OF POWERED ELEMENT 612 | ERROR | PCC 612 | PCC OF POWERED ELEMENT 614 | ERROR |
| 5A | PPCC 614 | | ERROR | PCC 614 | RCC OF POWERED ELEMENT 612 | ERROR |

712 →

| ARCHITECTED CONNECTION 714 | EXPECTED PHYSICAL CONNECTION 715 | PHYSICAL INFORMATION 716 | CONDITION 720 | EXPECTED LOGICAL CONNECTION 717 | LOGICAL INFORMATION 718 | CONDITION 721 |
|---|---|---|---|---|---|---|
| 1B | RPCC 606 | RPCC OF POWERED ELEMENT 606 | | RCC 606 | RCC OF POWERED ELEMENT 606 | |
| 2B | RPCC 608 | RPCC OF POWERED ELEMENT 608 | | RCC 608 | RCC OF POWERED ELEMENT 614 | ERROR |
| 3B | RPCC 610 | RPCC OF POWERED ELEMENT 610 | | RCC 610 | RCC OF POWERED ELEMENT 608 | ERROR |
| 4B | RPCC 612 | PPCC OF POWERED ELEMENT 612 | ERROR | RCC 612 | RCC OF POWERED ELEMENT 610 | ERROR |
| 5B | RPCC 614 | RPCC OF POWERED ELEMENT 612 | ERROR | RCC 614 | | ERROR |

*FIG. 7*

VALIDATING PHYSICAL AND LOGICAL SYSTEM CONNECTIVITY OF COMPONENTS IN A DATA PROCESSING SYSTEM

BACKGROUND

1. Technical Field

The present application relates generally to data processing system communications. More specifically, the present application is directed to validating physical and logical system connectivity of components in a data processing system.

2. Description of Related Art

Large scale rack mounted data processing systems, such as enterprise class data processing systems, require numerous cables to interconnect the various elements of the system together. For instance, a relatively small system may contain over a hundred cables while higher-end systems may contain thousands of cables. Not only is the routing of cables difficult, it is also very expensive, provides many failure points, and requires stocking of numerous field replaceable units. As systems grow, so does the cabling, especially in redundant systems where there is often a need for tow cables for the power and communication connections per element (to handle the high failure rates inherent to a mechanical design). In other words, for each element, there is a primary power cable, a redundant power cable, a primary communication cable, and a redundant communication cable. Thus, a system of eight elements may require 32 cables. Additionally, more complexity and cost is incurred because using primary and redundant communications requires a separate interconnect attachment structure such as a switch.

As stated previously, cable routing is difficult, provides failure points in the system, etc. These problems are increased with larger systems requiring even more cabling. Additionally, larger systems that require even more cabling also provide more instances where cabling may be installed improperly. Therefore, a need exists to identify the components that exist within a data processing system and validate that the components within the data processing system are physically and logically cabled correctly for functional interfaces, such as fibre channel (FC), Serial Attached SCSI (SAS), power, and the like.

SUMMARY

The illustrative embodiments provide automated mechanisms for identifying components connected to a data processing system and validating that the components within the data processing system are physically and logically cabled correctly. A programming server/client uses response data to identify the powered elements connected to the data processing system and validate that the powered elements within the data processing system are physically and logically cabled correctly for functional interfaces. That is, each of the powered elements in the network receives an instruction via a communication connection and/or the alternating current (AC) power lines. If the instruction is received via the AC power lines, the powered elements each extract the instruction from the AC power lines, if necessary, and process the instruction to facilitate a discovery operation.

Whether the instructions are received via a communications controller, or an alternating current (AC) power distribution and communication (ACPDC) controller, if the instruction is a discovery operation, the powered element executes discovery operation. Once the powered element finishes executing the discovery operation, the powered element responds to the communications controller and/or the ACPDC controller with response data that includes logical or physical connection information. The programming server/client uses response data to identify the powered elements connected to the data processing system and validate that the powered elements within the data processing system are physically and logically cabled correctly for functional interfaces.

The illustrative embodiments provide for validating a connection of powered elements within a data processing system. The illustrative embodiments issue a request for data to a set of powered elements using a set of communication channels. In the illustrative embodiments, the set of communication channels comprises one or more alternating current power lines. In the illustrative embodiments, the request is sent as a set of instructions injected onto the communication channels to the set of powered elements. The illustrative embodiments receive the data from the set of powered elements using the set of communication channels. In the illustrative embodiments, the data includes physical connection information for the set of powered elements. The illustrative embodiments determine if each powered element in the set of powered elements is connected using the one or more alternating current power lines in a predetermined configuration. The illustrative embodiments present to a user a notification of each powered element in the set of powered elements that is not connected in the predetermined configuration.

In determining if each powered element in the set of powered elements is connected using the one or more alternating current power lines in a predetermined configuration, the illustrative embodiments may compare the physical connection information to an expected configuration. In the illustrative embodiments, the set of communication channels may comprise one or more data communication links. With one or more data communication links, the illustrative embodiments may issue the request for data to the set of powered elements using the one or more data communication links. The illustrative embodiments may then receive the data using the one or more data communication links from the set of powered elements, wherein the data includes logical connection information for the set of powered elements. The illustrative embodiments may determine if each powered element in the set of powered elements is connected using the one or more data communication links in the predetermined configuration. The illustrative embodiments may identify to the user each powered element in the set of powered elements that is not connected using the one or more data communication links in the predetermined configuration.

In determining if each powered element in the set of powered elements is connected using the one or more data communication links in a predetermined configuration, the illustrative embodiments may compare the logical connection information to an expected configuration. In receiving the data using the set of communication channels from the set of powered elements, the illustrative embodiments may receive the one or more alternating current power lines with the data. The illustrative embodiments may extract the data from the one or more alternating current power lines. The illustrative embodiments may determine if the data is from a powered element in the set of powered elements. Responsive to the data originating from the powered element, the illustrative embodiments may use the data for analysis.

In the illustrative embodiments, a powered element in the set of powered elements may be a field replaceable unit and wherein the field replaceable unit is at least one of a computer, router, switch, modular storage element, controller, printer, disk drive module, or serial attached SCSI hard disk drive. In the illustrative embodiments, the set of powered elements may reside within a set of equipment racks in a rack system. In the illustrative embodiments, the notification of each powered element in the set of powered elements that is not connected in the predetermined configuration may be presented to the user using at least one of sending the notification to a printer, sending the notification to a display, automatically creating a work order that includes the notification and sending the work order to an email of a person responsible for the powered element, or providing a notification that is audible to the user.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a system is provided. The system may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 depicts the identification of powered elements connected to a network and verification of cabling of the powered elements in accordance with an illustrative embodiment;

DETAILED DESCRIPTION OF THE ILLUSTRATIVE EMBODIMENTS

Figure 1:
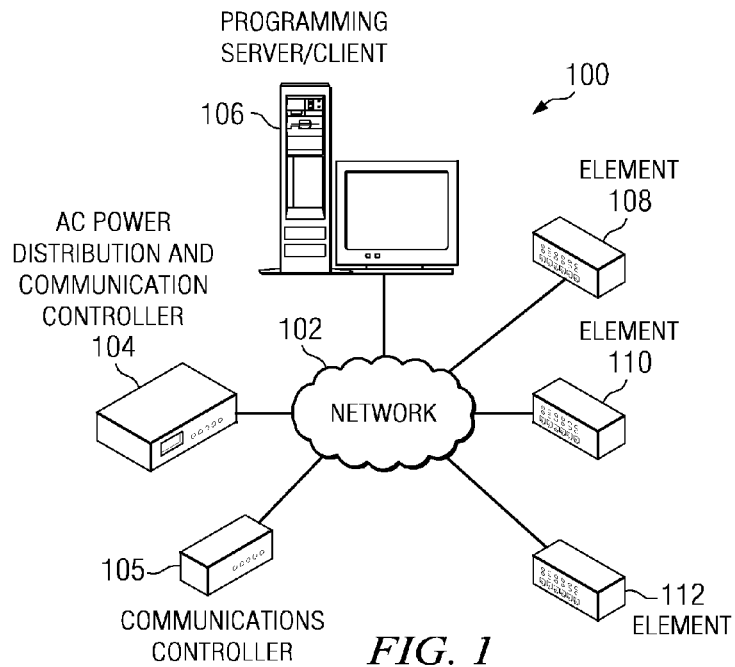
FIG. 1 is a representation of an exemplary distributed data processing system in which aspects of the illustrative embodiments may be implemented.
Figure 2:
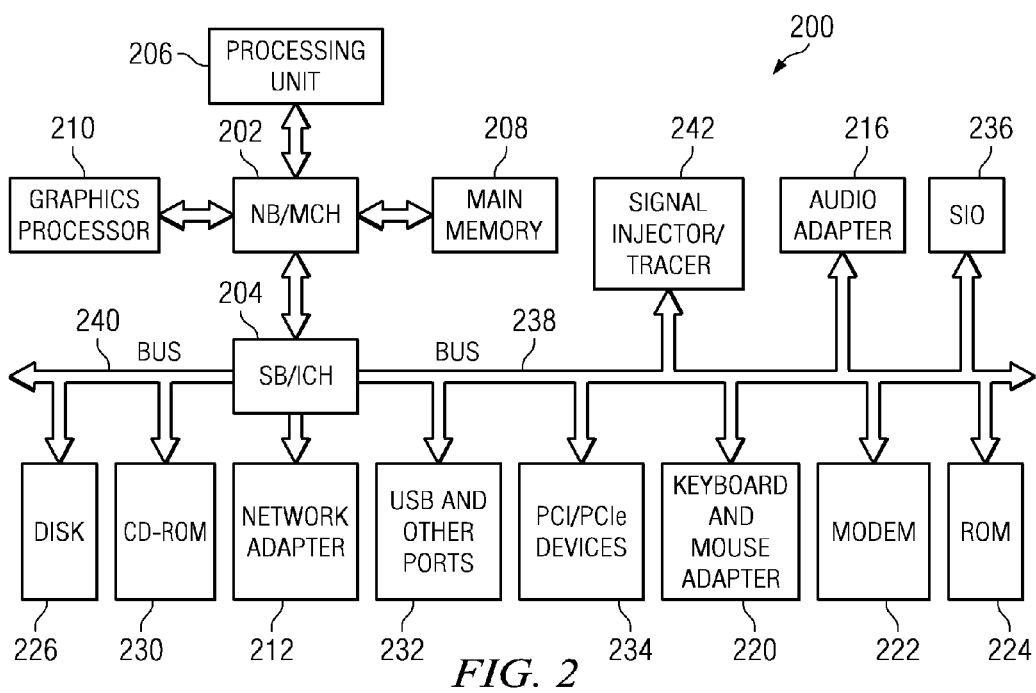
FIG. 2 shows a block diagram of an exemplary data processing system in which aspects of the illustrative embodiments may be implemented.

The illustrative embodiments provide automated mechanisms for identifying components connected to a data processing system and validating that the components within the data processing system are physically and logically cabled correctly. As such, the automated mechanisms of the illustrative embodiments are especially well suited for implementation within a distributed data processing environment and within, or in association with, data processing devices, such as servers, client devices, and the like. In order to provide a context for the description of the mechanisms of the illustrative embodiments, FIGS. 1 and 2 are provided hereafter as an example of a distributed data processing system, or environment, and a data processing device, in which, or with which, the mechanisms of the illustrative embodiments may be implemented. It should be appreciated that FIGS. 1 and 2 are only exemplary and is not intended to assert or imply any limitation with regard to the environments in which aspects or embodiments of the present invention may be implemented. Many modifications to the depicted environments may be made without departing from the spirit and scope of the present invention.

FIG. 1 is a representation of an exemplary distributed data processing system in which aspects of the illustrative embodiments may be implemented. Distributed data processing system 100 may include a network of data processing systems in which aspects of the illustrative embodiments may be implemented. Distributed data processing system 100 includes at least one network 102, which is the medium used to provide communication links between various devices and computers connected together within distributed data processing system 100. Network 102 may include communication channels or connections, such as, wired links, wireless communication links, fiber optic cables, or the like. In the depicted example, alternating current (AC) power distribution and communication (ACPDC) controller 104, communications controller 105, and programming server/client 106 are connected to network 102. ACPDC controller 104 and programming server/client 106 may be separate devices or one device performing both functions.

Powered elements 108, 110, and 112 may also be connected to network 102. Powered elements 108, 110, and 112 may be mounted within equipment racks within distributed data processing system 100. One or more equipment racks housing powered elements, such as powered elements 108, 110, and 112, may be referred to as a rack system. Each of powered elements 108, 110, and 112 may be a field replaceable unit (FRU). A FRU may be, for examples, a circuit board, part, or assembly that may be quickly and easily removed from a personal computer or other piece of electronic equipment and replaced by the user or by a technician without having to send the entire product or system to a repair facility. Examples of powered elements 108, 110, and 112 may be computers, routers, switches, modular storage elements, controllers, printers, serial attached SCSI hard disk drive (SAS HDD), or the like. Each of powered elements 108, 110, and 112 may have a unique network address, sometimes called a data link control (DLC) address, media access control (MAC) address, or the like.

The unique network address may be part of vital product data (VPD) of powered elements 108, 110, and 112. VPD is information provided in association with powered elements 108, 110, and 112, such as in a storage device of powered elements 108, 110, and 112, and which may be loaded into ACPDC controller 104 and communications controller 105 when powered elements 108, 110, and 112 are initiated in the system, for example. VPD information may also be provided separately from powered elements 108, 110, and 112, and may be loaded into ACPDC controller 104 and communications controller 105. The unique network address allows powered elements 108, 110, and 112 to be administered at a system or network level by ACPDC controller 104 and/or communications controller 105. Vital product data may include a powered element model number, a unique serial number, product release level, maintenance level, address, or other information specific to the device type. Vital product data may also include user-defined information, such as the building, room, row, rack, shelf, or the like for the element. The collection and use of vital product data allows the status of a network or computer system to be understood and service provided more quickly.

In the depicted example, programming server/client 106 provides a set of instructions, such as boot files, updated configurations, operating system images, validation checks, and applications, to powered elements 108, 110, and 112 via ACPDC controller 104 and/or communications controller 105. The set of instructions may be one or more instructions. Powered elements 108, 110, and 112 are clients to ACPDC controller 104 and communications controller 105 in the depicted example. Distributed data processing system 100 may include additional ACPDC controllers, programming servers, programming clients, and other devices not shown.

Distributed data processing system 100 is a network with network 102 representing a power grid that supplies power to the powered elements that are connected to the power grid. Of course, distributed data processing system 100 may also be implemented to include a number of different types of networks, such as for example, an Internet, an intranet, a local area network (LAN), a wide area network (WAN), or the like. As stated above, FIG. 1 is intended as an example, not as an architectural limitation for different embodiments, and therefore, the particular powered elements shown in FIG. 1 should not be considered limiting with regard to the environments in which the illustrative embodiments may be implemented.

In the depicted example, powered elements 108, 110, and 112 may be required to physically and/or logically connect to ACPDC controller 104 and communications controller 105 in a predetermined configuration. For example. ACPDC controller 104 may have preconfigured connections, such as dedicated power receptacles, where each of powered elements 108, 110, and 112 are to connect to a specific power receptacle based on a preconfigured configuration for each of powered elements 108, 110, and 112. For example, ACPDC controller 104 may have three dedicated power receptacles A, B, and C, which are referred to as preconfigured connections. During an initial configuration of ACPDC controller 104, power receptacle A is preconfigured to send instructions and receive response data over the power line to and from powered element 108, power receptacle B is preconfigured to send instructions and receive response data over the power line to and from powered element 110, and power receptacle C is preconfigured to send instructions and receive response data over the power line to and from powered element 112. Therefore, if powered element 108 were connected to power receptacle C on ACPDC controller 104 and powered element 110 were connected to power receptacle A, both powered element 108 and powered element 110 may operate but may not function properly because ACPDC controller 104 has preconfigured power receptacle A and C to send instructions and receive response data to and from powered element 108 and 110, respectively. Additionally powered elements 108, 110, and 112 may have other communication links that interconnect to communications controller 105 and to each other in a predetermined manner.

Powered elements 108, 110, and 112 may receive instructions in various ways. One way is for powered elements 108, 110, and 112 to receive instructions via communications controller 105. Communicating over data communication links using a communication controller is generally known in the art.

Another way is for powered elements 108, 110, and 112 to receive instructions over the power lines. To receive an instruction via the power lines, ACPDC controller 104 injects the instruction onto network 102 over the preconfigured connections, which provide power to powered elements 108, 110, and 112. Powered elements 108, 110, and 112 determine if the instruction transmitted via the AC power lines of the power grid provided by network 102 should be acted upon using an address embedded within the instruction. That is, each of powered elements 108, 110, and 112 receives the instruction via the AC power lines and extracts the instruction from the AC power lines. Each of powered elements 108, 110, and 112 include one or more signal injectors/tracers that are responsible for injecting and extracting the high-frequency communication carrier signals that are combined with the power signal received from and sent to ACPDC controller 104. A detailed description of the injection and extraction process performed by a powered element is described in FIG. 5. Powered elements 108, 110, and 112 may then compare an embedded target address included with the instruction to the address of the particular element. If there is a match between the addresses, the corresponding powered element 108, 110, or 112 processes and executes the instruction. A similar operation may be performed with regard to instructions received over communication links from communications controller 105.

However, there may also be instances where powered elements 108, 110, and 112 will execute and respond to generic instructions. Generic instructions may be instructions that do not include a specified address, or instructions that powered elements 108, 110, and 112 are preprogrammed to execute without an included address, such as a discovery operation, or the like. A discovery operation is a operation that may be sent out by a data processing system, such as programming server/client 106, that requests that all components, such as powered elements 108, 110, and 112, respond with identification information, such as a unique network address, primary power supply serial number, redundant power supply serial number, enclosure serial number, or other vital product data (VPD). Discovery operations are intended to discover all components that are connected to the same data processing system and do not specifically target any one component, such as with using addresses as discussed above.

Powered elements 108, 110, and 112 respond to communications controller 105 by using known communication protocols. Powered elements 108, 110, and 112 respond to ACPDC controller 104 by injecting response data onto the power line. ACPDC controller 104 extracts the response data sent by powered elements 108, 110, and 112 from the power line and sends the response data to programming server/client 106. A detailed description of the injection and extraction process performed by an ACPDC controller is described in FIG. 4. Programming server/client 106 uses the response data to identify powered elements 108, 110, and 112 as connected to network 102 and validates that powered elements 108, 110, and 112 are physically and logically cabled correctly for functional interfaces by comparing the response data received via ACPDC controller 104 and/or communications controller 105 to expected connection data and/or to each other. In these illustrative embodiments, a powered element being physically cabled correctly refers to the powered element being connected to ACPDC controller 104 in the predetermined manner using the preconfigured connection. Also in these illustrative embodiments, a powered element being logically cabled correctly refers to the powered element being connected to communications controller 105 in the predetermined configuration, which may be directly or through another powered element. A detailed description of the identification and validation process performed by programming server/client 106 is described in FIG. 3.

With reference now to FIG. 2, a block diagram of an exemplary data processing system is shown in which aspects of the illustrative embodiments may be implemented. Data processing system 200 is an example of a computer, such as programming server/client 106, communications controller 105, ACPDC controller 104, or powered elements 108, 110, or 112 in FIG. 1, in which computer usable code or instructions implementing the processes for illustrative embodiments may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems. Inc. in the United States, other countries, or both).

As a server, data processing system 200 may be, for example, an IBM® eServer™ System p™ computer system, running the Advanced Interactive Executive (AIX®) operating system or the LINUX® operating system (eServer, System p and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments may be performed by processing unit 206 using computer usable program code, which may be located in a memory such as, for example, main memory 208. ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the illustrative embodiments.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Data processing system 200 operating as a programming server/client, such as programming server/client 106 of FIG. 1, provides instructions, such as boot files, updated configurations, operating system images, validation checks, applications or the like, and analyzes response data. Data processing system 200 operating as a communication controller receives response data and transmits instructions onto a network through network adapter 212. Data processing system 200 operating as an ACPDC controller injects instructions and extracts response data onto a power network through signal injector/tracer 242. The network provides power and communication links to the powered elements.

Data processing system 200 operating as a powered element receives instructions and transmits response data from and to a communications controller and/or an ACPDC controller, such as communications controller 105 and ACPDC controller 104 in FIG. 1. That is, each of the powered elements in the network receive an instruction via a communication connection and/or the power lines with the powered element extracting the instructions. Whether the instruction is received via a communications controller or an ACPDC controller, a determination is made as to whether the instruction is generic, e.g. is a discovery operation, or should be used for specific configuration of the powered element based on an address included with the instruction. If the instruction is not a generic instruction, the powered element compares an included target address to the address of the particular powered element. If there is a match between the addresses or if the instruction is generic, the corresponding powered element executes the instruction.

Once the powered element finishes executing an instruction received via a communications controller, the powered element may respond to the communications controller with response data. For example, if the instruction is a discovery operation, the powered element may respond with logical connection information, such as a powered element model number, a unique serial number, product release level, maintenance level, address, or other information specific to the device type as well as the powered element(s) or communications controller the powered element received the discovery operation from by using known communication protocols, depending on the information requested in the discovery operation. As described above, a powered element being logically cabled correctly refers to the powered element being connected to the communications controller in the predetermined configuration, which may be directly or through another powered element.

Once the powered element finishes executing an instruction received via an ACPDC controller, the powered element may respond to the ACPDC controller by injecting response data onto the power lines. For example, if the instruction is a discovery operation, the powered element may respond with physical connection information, such as a power supply serial number, a powered element model number, a unique serial number, product release level, maintenance level, address, or other information specific to the device type onto the power lines, depending on the information requested in the discovery operation. As described above, a powered element being physically cabled correctly refers to the powered element being connected to the ACPDC controller in the predetermined manner using a preconfigured connection. The ACPDC controller extracts the response data sent by the powered elements from the AC power lines and sends it to a programming server/client.

If the programming server/client issued a discovery operation, the programming server/client compares the response data received from the communications controller and/or the ACPDC controller to expected physical and/or logical connection configurations. By comparing the received physical and/or logical connection information to the expected connection configuration, the programming server/client is able to identify the powered elements connected to the data processing system and validate that the powered elements within the data processing system are physically and logically cabled correctly for functional interfaces.

Figure 3:
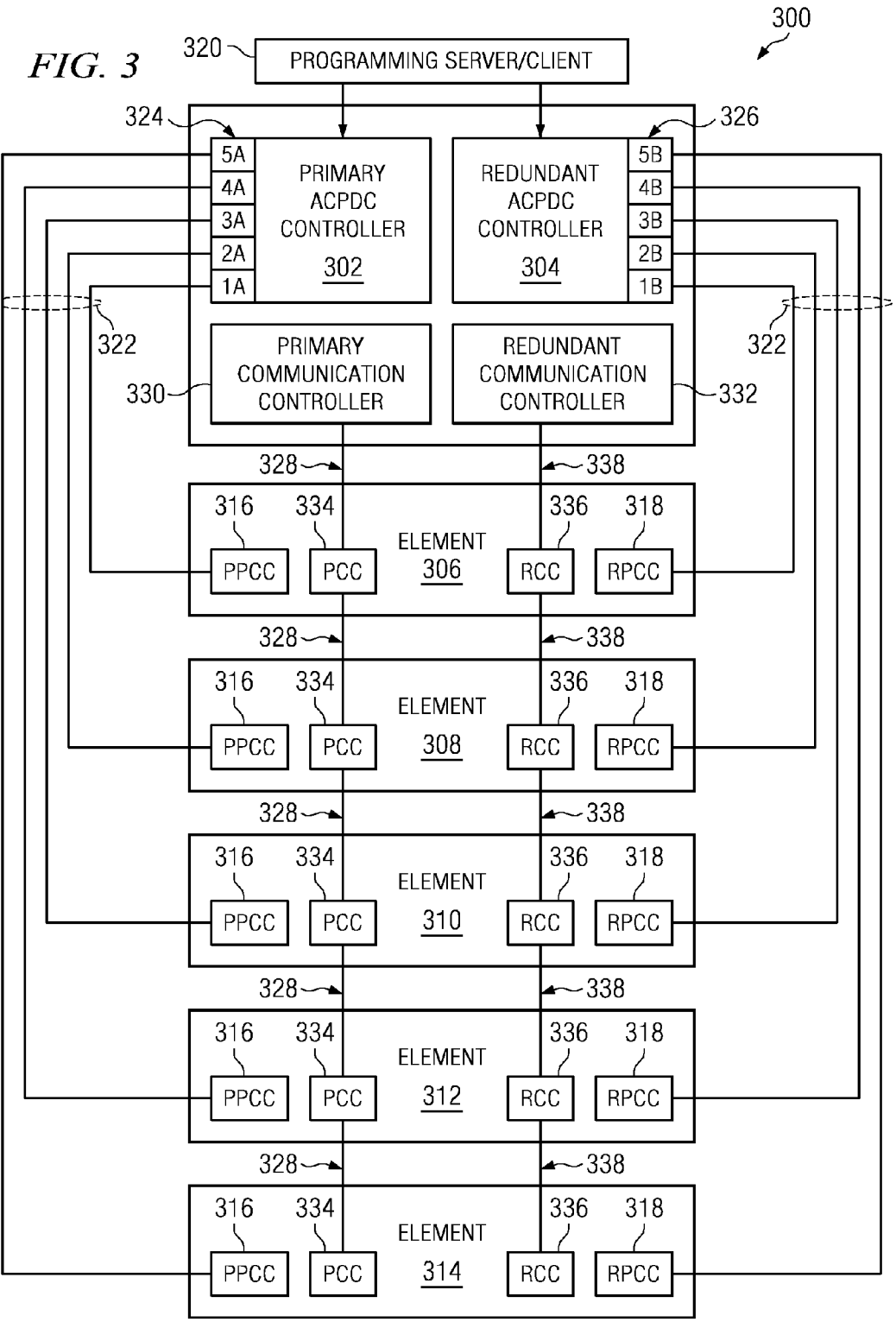
FIG. 3 depicts a configuration of powered elements within a network in accordance with an illustrative embodiment.

FIG. 3 depicts a configuration of powered elements within a network in accordance with an illustrative embodiment. Powered element configuration 300 includes primary communication controller 330 for providing standard data communication paths to powered elements 306-314 and redundant communication controller 332 for providing a backup to primary communication controller 330 in an instance where primary communication controller 330 is not able to communicate with powered elements 306-314. Primary communication controller 330 and redundant communication controller 332 may be stand-alone controllers or a single controller providing both primary and redundant control.

Powered element configuration 300 also includes primary alternating current (AC) power distribution and communication (ACPDC) controller 302 and redundant ACPDC controller 304, such as ACPDC controller 104 of FIG. 1. Primary ACPDC controller 302 provides power to powered elements 306-314. Redundant ACPDC controller 304 provides a backup to primary ACPDC controller 302 in an instance where primary ACPDC controller 302 is not able to provide power to powered elements 306-314. Primary ACPDC controller 302 also provides a backup to primary communication controller 330 and redundant communication controller 332 in an instance where both primary communication controller 330 and redundant communication controller 332 are not able to communicate with powered elements 306-314. Redundant ACPDC controller 304 also provides a backup to primary communication controller 330, redundant communication controller 332, and primary ACPDC controller 302 in an instance where primary communication controller 330, redundant communication controller 332, and primary ACPDC controller 302 are not able to communicate with powered elements 306-314. While both primary ACPDC controller 302 and redundant ACPDC controller 304 are normally used as backup communication controllers, communications may be established through primary ACPDC controller 302 and/or redundant ACPDC controller 304 apart from the failure of primary communication controller 330 and redundant communication controller 332. Primary ACPDC controller 302 and redundant ACPDC controller 304 may be stand-alone controllers or a single controller providing both primary and redundant control.

Each of powered elements 306-314 includes primary communication connection (PCC) 334, redundant communication connection (RCC) 336, primary power and data communication connection (PPCC) 316, and redundant power and data communication connection (RPCC) 318. PCC 334 and RCC 336 provide primary data communication path connections to powered elements 306-314 via primary data communication links 328 and redundant data communication links 338, which may also be referred to as a set of communication channels. Powered elements 306-314 may be field replaceable units, such as processor nests, disk enclosures, serial attached SCSI hard disk drives (SAS HDDs), switches, or the like.

In powered element configuration 300, primary ACPDC controller 302 and redundant ACPDC controller 304 allow for completely redundant and isolated data communication paths from primary communication controller 330 and redundant communication controller 332 by injecting instructions provided from programming server/client 320 onto the power line. Thus, using a combined power and data communication links 322, primary data communication links 328, and redundant data communication links 338, which may be referred to as a set of communication channels, allow for controlling powered elements 306-314 with instructions, such as, on, off, status, configuration, power cycling, discovery operations, or the like. Instructions sent via power and data communication links 322, primary data communication links 328, and/or redundant data communication links 338 may be executed, for example, with the intent of identifying components connected to primary communication controller 330, redundant communication controller 332, ACPDC controller 302, and/or redundant ACPDC controller 304 and validating that the components are connected correctly.

In the depicted example, powered element 306 is physically connected to primary ACPDC controller 302 and redundant ACPDC controller 304 in a predetermined configuration using preconfigured connectors 324 and 326. As described above, a powered element being physically cabled correctly refers to the powered element being connected to the ACPDC controller in a predetermined manner using a preconfigured connection. In this example, powered elements 306-314 are connected to connections 1A, 2A, 3A, 4A, and 5A, respectively, of preconfigured connectors 324 of primary ACPDC controller 302 and powered elements 306-314 are connected to connections 1B, 2B, 3B, 4B, and 5B, respectively, of preconfigured connectors 326 of redundant ACPDC controller 304. Additionally, powered elements 306-314 are logically connected to primary communication controller 330 and redundant communication controller 332 through primary data communication links 328 and redundant data communication links 338. As described above, a powered element being logically cabled correctly refers to the powered element being connected to the communications controller in the predetermined configuration, which may be directly or through another powered element.

During the lifetime of powered element configuration 300, powered elements 306-314 may be added or removed to powered element configuration 300. Likewise, with the addition or removal of powered elements 306-314, power and data communication links 322, primary data communication links 328, and redundant data communication links 338 within powered element configuration 300 may be added and removed. Before powered elements 306-314 are added or removed to powered element configuration 300, a system architect, or other user of powered element configuration 300, plans where components, such as powered elements 306-314, primary ACPDC controller 302, redundant ACPDC controller 304, and the like, will be installed and the configuration of the cabling of these components. In the illustrative embodiments, the system architect updates a configuration table or other data structure in programming server/client 320 with data for each powered element, such as a unique network address, rack location, preconfigured connection, interelement connections, other vital product data (VPD), or the like. At some time after the powered element(s) has been installed, the system architect may want to compare the actual physical and logical connections to the expected connections of powered elements 306-314, thus, verifying that powered elements 306-314 are correctly cabled.

In order to confirm that powered elements 306-314 are correctly installed in powered element configuration 300, programming server/client 320 may issue a discovery operation to primary communication controller 330 and redundant communication controller 332, which is further communicated to powered elements 306-314 through PCCs 334 and RCCs 336 using primary data communication links 328 and redundant data communication links 338. Powered elements 306-314 determine if the discovery operation should be executed using an address embedded within the communication data if the discovery operation is not generic, which will be described in detail in FIG. 5. Primary communication controller 330, redundant communication controller 332, and powered elements 306-314 may respond to the discovery operation with response data that includes logical connection information, such as a powered element model number, a unique serial number, product release level, maintenance level, address, other information specific to the device type, the powered element(s) or communication controller the powered element received the discovery operation from, or the like, depending on the information requested in the discovery operation.

Programming server/client 320 may also issue a discovery operation to primary ACPDC controller 302 and redundant ACPDC controller 304. Primary ACPDC controller 302 and redundant ACPDC controller 304 may inject the discovery operation onto power and data communication links 322 to powered elements 306-314, which will be described in detail in FIG. 4. Powered elements 306-314 determine if the discovery operation should be executed using an address included within the discovery operation if the discovery operation is not generic. That is, each of powered elements 306-314 receives the discovery operation via power and data communication links 322 and extracts the discovery operation from the power line provided through power and data communication links 322.

In this example, the discovery operation issued by programming server/client 320 is a generic instruction. Thus, powered elements 306-314 would forgo comparing an included target address to the address of the particular element and execute the discovery operation. Powered elements 306-314 respond to the execution of the discovery operation by packaging response data that includes physical connection information. Powered elements 306-314 inject the response data onto power and data communication links 322. Powered elements 306-314, as well as primary ACPDC controller 302 and redundant ACPDC controller 304, may respond to the discovery operation with physical connection information such as a power supply serial number, a powered element model number, a unique serial number, product release level, maintenance level, address, other information specific to the device type, or the like, depending on the information requested in the discovery operation. Primary ACPDC controller 302 and/or redundant ACPDC controller 304 extract the communication data sent by powered elements 306-314 from power and data communication links 322 and send the response data as physical connection information to programming server/client 320.

Programming server/client 320 may compare the physical connection information received from primary ACPDC controller 302 and redundant ACPDC controller 304 and/or the logical connection information received from primary communication controller 330 and redundant communication controller 332 to an expected connection configuration. Both the physical connection information and the logical connection information may also be compared to each other. If in comparing the physical connection information and/or the logical connection information to the expected connection configuration, there are inconsistencies in the information, a notification may be generated so that the inconsistencies may be addressed. The notification may be stored or presented to a user, such as by sending the notification to a printer, sending the notification to a display, automatically creating a work order that includes a notification and sending the work order to an email of a person responsible for the powered element, providing an audible notification to the user, or the like.

In order to validate that powered elements 306-314 within powered element configuration 300 are physically and logically cabled correctly, programming server/client 320 may request additional information from primary ACPDC controller 302 and redundant ACPDC controller 304 when information is returned to programming server/client 320. That is, primary ACPDC controller 302 and redundant ACPDC controller 304 may associate each of preconfigured connectors 324 and 326 with the identification information from each of powered elements 306-314. Primary ACPDC controller 302 and redundant ACPDC controller 304 may send the identification information and associated connector information to programming server/client 320. By comparing the connector information, the identification information, and the functional information of each of the powered elements, programming server/client 320 determines if a cabling error exists. As discussed previously, the system architect's configuration table may also include an identification of the particular ones, both primary and redundant, of preconfigured connectors 324 and 326 each one of powered elements 306-314 is to connect to.

Figure 4:
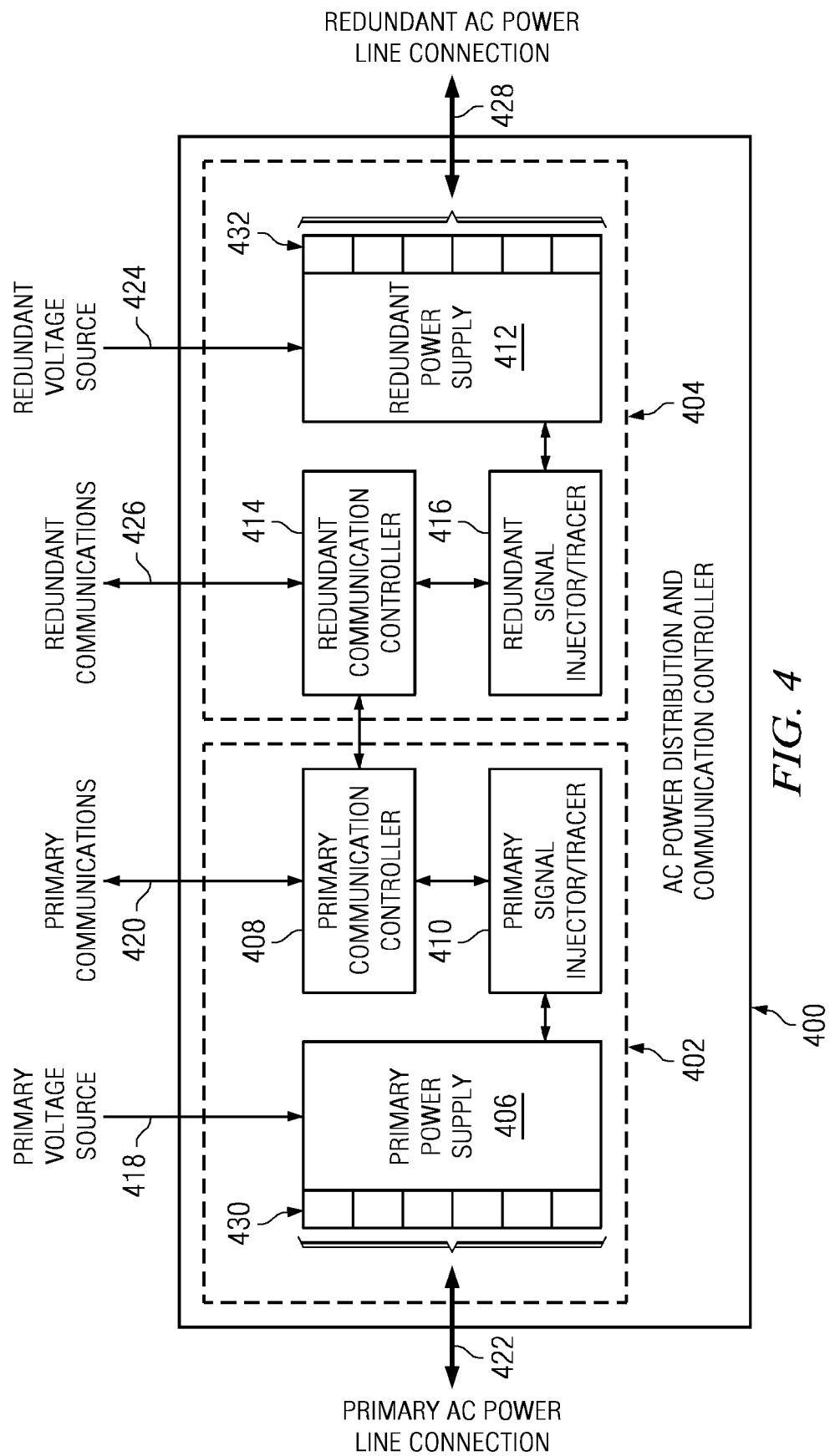
FIG. 4 depicts an exemplary ACPDC controller in accordance with an illustrative embodiment.

FIG. 4 depicts an exemplary ACPDC controller in accordance with an illustrative embodiment. ACPDC controller 400 includes primary ACPDC controller 402 and redundant ACPDC controller 404, similar to primary ACPDC controller 302 and redundant ACPDC controller 304 of FIG. 3. Primary ACPDC controller 402 includes primary power supply 406, primary communication controller 408, and primary signal injector/tracer 410. Redundant ACPDC controller 404 includes redundant power supply 412, redundant communication controller 414, and redundant signal injector/tracer 416. Primary power supply 406 receives AC power from primary voltage source 418.

Primary communication controller 408, which is a data processing system, receives and transmits primary communications 420 from and to a programming server/client. Primary communications 420 are high-frequency communication carrier signals along a communication channel. Primary signal injector/tracer 410 injects the high-frequency communication carrier signal received from primary communication controller 408 onto the AC power line of primary power supply 406. Primary signal injector/tracer 410 is also responsible for extracting the high-frequency communication carrier signal received from a powered element. The combined signal is sent to the powered elements in the network node over primary AC power line connection 422, which may also be referred to as a communication channel.

Redundant power supply 412 receives AC power from redundant voltage source 424. Redundant communication controller 414, which is a data processing system, receives and transmits redundant communications 426 along a communication channel from and to the programming server/client. Redundant communications 426 are also high-frequency communication carrier signals. Redundant signal injector/tracer 416 injects the high-frequency communication carrier signal received from redundant communication controller 414 onto the AC power line of redundant power supply 412. Redundant signal injector/tracer 416 is also responsible for extracting the high-frequency communication carrier signal received from a powered element. The combined signal is sent to the powered elements in the network node over redundant AC power line connection 428, which may also be referred to as a communication channel.

Thus, primary signal injector/tracer 410 injects instructions onto primary voltage source 418 to powered elements through primary AC power line connection 422. Likewise, if primary voltage source 418 fails to deliver power, primary power supply 406 ceases to function, or communications through primary communication controller 408 is lost, redundant signal injector/tracer 416 injects instructions onto redundant voltage source 424 to powered elements through redundant AC power line connection 428. Each powered element may be connected to primary power supply 406 and redundant power supply 412 on preconfigured connections 430 and 432. Preconfigured connections 430 and 432 provide multiple connects to which numerous powered elements may be connected. Each of preconfigured connection 430 and 432 may be configured by a programming server/client and/or ACPDC controller 400 for a particular powered element. Thus, programming server/client and/or ACPDC controller 400 may use preconfigured connections 430 and 432 to identify powered elements and verify that the powered elements are cabled correctly.

To identify powered elements, primary communication controller 408 and/or redundant communication controller 414 receives a discovery operation from a programming server/client via primary communications 420 and/or redundant communications 426. Primary communication controller 408 and redundant communication controller 414 packages the discovery operation into communication data and primary signal injector/tracer 410 and/or redundant signal injector/tracer 416 inject the communication data onto primary AC power line connection 422 and/or redundant AC power line connection 428 to the powered elements. Once primary ACPDC controller 402 and/or redundant ACPDC controller 404 receive response data from the powered elements, primary signal injector/tracer 410 and/or redundant signal injector/tracer 416 extract the response data sent by the powered elements from primary AC power line connection 422 and/or redundant AC power line connection 428. Then, primary communication controller 408 and redundant communication controller 414 send the response data from the powered elements along with preconfigured connection 430 and 432, if requested, to the programming server/client.

Figure 5:
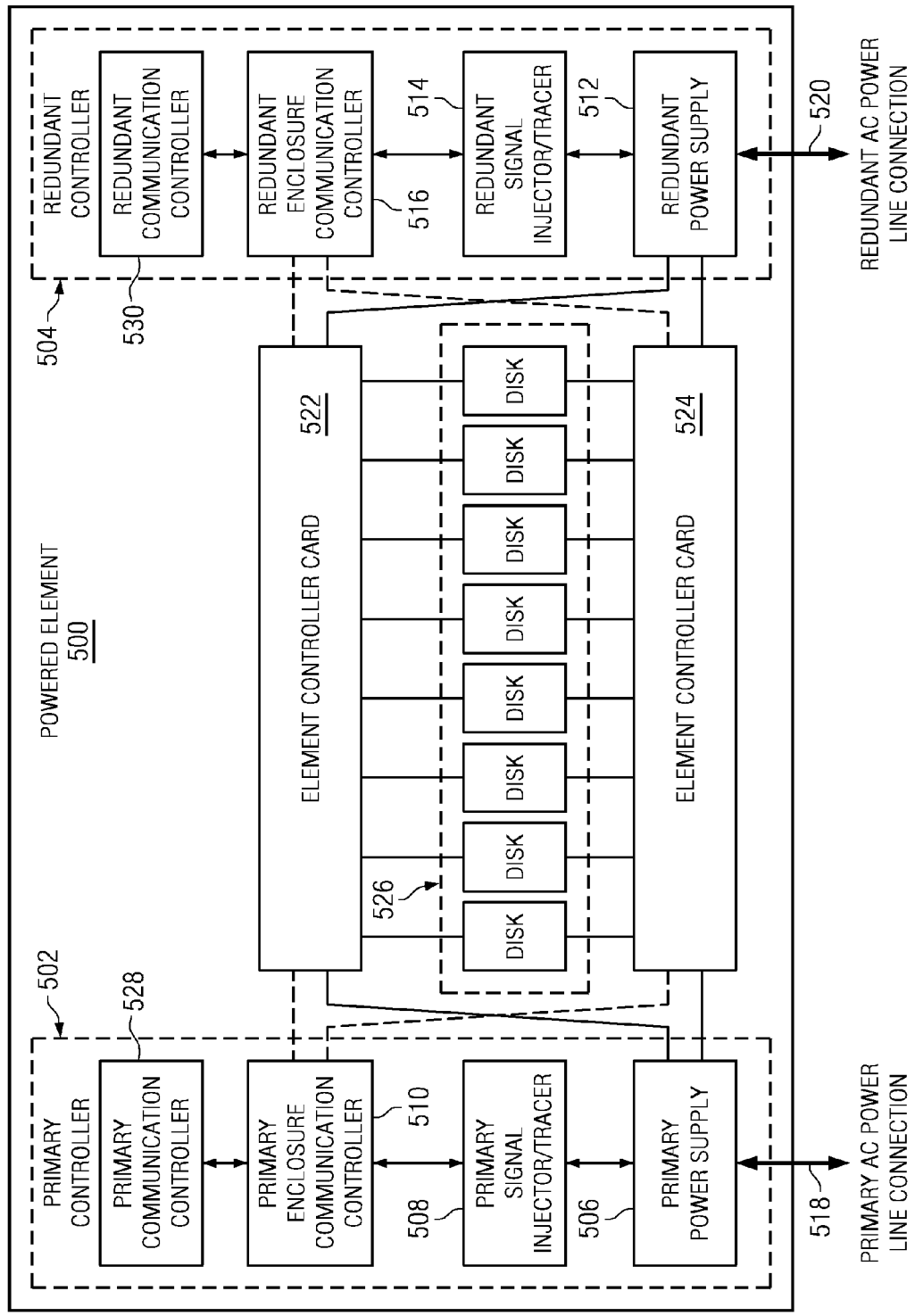
FIG. 5 depicts an exemplary powered element in accordance with an illustrative embodiment.

FIG. 5 depicts an exemplary powered element in accordance with an illustrative embodiment. Powered element 500, such as one of powered elements 306-314 of FIG. 3, includes primary controller 502 and redundant controller 504. Primary controller 502 includes primary power supply 506, primary signal injector/tracer 508, and primary enclosure communication controller 510. Powered element 500 may be a field replaceable unit, such as a serial attached SCSI hard disk drive (SAS HDD). Redundant controller 504 includes redundant power supply 512, redundant signal injector/tracer 514, and redundant enclosure communication controller 516.

Primary power supply 506 receives AC power from the primary power supply of an ACPDC controller over primary AC power line connection 518, which may also be referred to as a communication channel. Primary signal injector/tracer 508 extracts any high-frequency communication carrier signal received from the ACPDC controller and sends the communication signal to primary enclosure communication controller 510, which is a data processing system. Primary signal injector/tracer 508 is also responsible for injecting any returning high-frequency communication carrier signals received from primary enclosure communication controller 510 onto the AC power signal of primary power supply 506. Thus, primary enclosure communication controller 510 may receive and transmit communication signals from and to primary signal injector/tracer 508. Primary enclosure communication controller 510 may also receive and transmit communication signals to and from primary communication controller 528, such as communication controller 330 of FIG. 3, along a communication channel. Communication signals received by primary enclosure communication controller 510 from primary signal injector/tracer 508 or from a primary communications controller may be powered element instructions, such as, on, off, status, configuration, discovery operation, power cycling, or the like.

Whether the communication signal is received via primary signal injector/tracer 508 or the primary communications controller, primary enclosure communication controller 510 determines if the received instruction is for the particular powered element by identifying the address information included with the instruction unless the received instruction is a generic instruction. If the address in the address information is not the address of the particular powered element, then primary enclosure communication controller 510 simply ignores the instruction. However, if the address in the address information is the address of powered element 500 or if the instruction is a generic instruction, then primary enclosure communication controller 510 executes the instruction included in the communication signal for the device within powered element 500, such as element controller cards 522 or 524, disk drive control cards 526, or the like, depending on which devices are within the powered element.

Redundant power supply 512 operates in a similar manner to primary controller 502. Redundant power supply 512 receives AC power from the redundant power supply of an ACPDC controller over redundant AC power line connection 520, which may also be referred to as a communication channel. Redundant signal injector/tracer 514 extracts the high-frequency communication carrier signal and sends the communication signal to redundant enclosure communication controller 516. Redundant signal injector/tracer 514 also injects any returning high-frequency communication carrier signals onto the AC power line of redundant power supply 512. Thus, redundant enclosure communication controller 516 may also receive and transmit high-frequency communication carrier signals from and to redundant signal injector/tracer 514. Redundant enclosure communication controller 516 may receive and transmit communication signals to and from redundant communication controller 530, such as communication controller 332 of FIG. 3, along a communication channel.

Again, since the communications signal is sent to each powered element, redundant enclosure communication controller 516 determines if the received instruction is for the particular powered element and if the address in the address information is the address of the powered element 500 or if the instruction is a generic instruction, then redundant enclosure communication controller 516 executes the instruction included in the communication signal for the device within powered element 500.

Redundant controller 504 continually monitors the functions performed by primary controller 502. Likewise, primary controller 502 continually monitors the functions performed by redundant controller 504. In the event the primary voltage source fails to deliver power, primary power supply 506 ceases to function, or communications through primary enclosure communication controller 510 is lost, for a predetermined amount of time, redundant controller 504 seizes control of powered element 500. Likewise, if the primary voltage source resumes delivering power, primary power supply 506 resumes functioning, or communications through primary enclosure communication controller 510 returns, primary controller 502 resumes control of powered element 500.

As with the example from above, in order to confirm that a powered element has been installed in a powered element configuration, powered element 500 may receive instructions from an ACPDC controller over primary AC power line connection 518 and redundant AC power line connection 520. If an instruction is received, primary signal injector/tracer 508 and redundant signal injector/tracer 514 extracts the instruction from primary AC power line connection 518 and redundant AC power line connection 520. Primary enclosure communication controller 510 and redundant enclosure communication controller 516 may also receive instructions via communication signals from primary communication controller 528 or redundant communication controller 530. Primary enclosure communication controller 510 and redundant enclosure communication controller 516 determine if the instruction should be executed using an address included with the instruction unless the instruction is generic.

If there is a match or if the instruction is generic, powered element 500 executes the instruction and sends response data back to the programming server/client via the primary ACPDC controller. In identifying a powered element, the instruction may be a discovery operation that is a generic instruction. Primary enclosure communication controller 510 and redundant enclosure communication controller 516 then retrieve any identification information regarding powered element 500 requested by the discovery operation. Once the identification information is retrieved, primary enclosure communication controller 510 and redundant enclosure communication controller 516 may package the identification information as response data. The response data may be returned by primary signal injector/tracer 508 and redundant signal injector/tracer 514 by injecting the response data onto primary AC power line connection 518 and redundant AC power line connection 520 or via communication signals to primary communication controller 528 or redundant communication controller 530.

Figure 6:
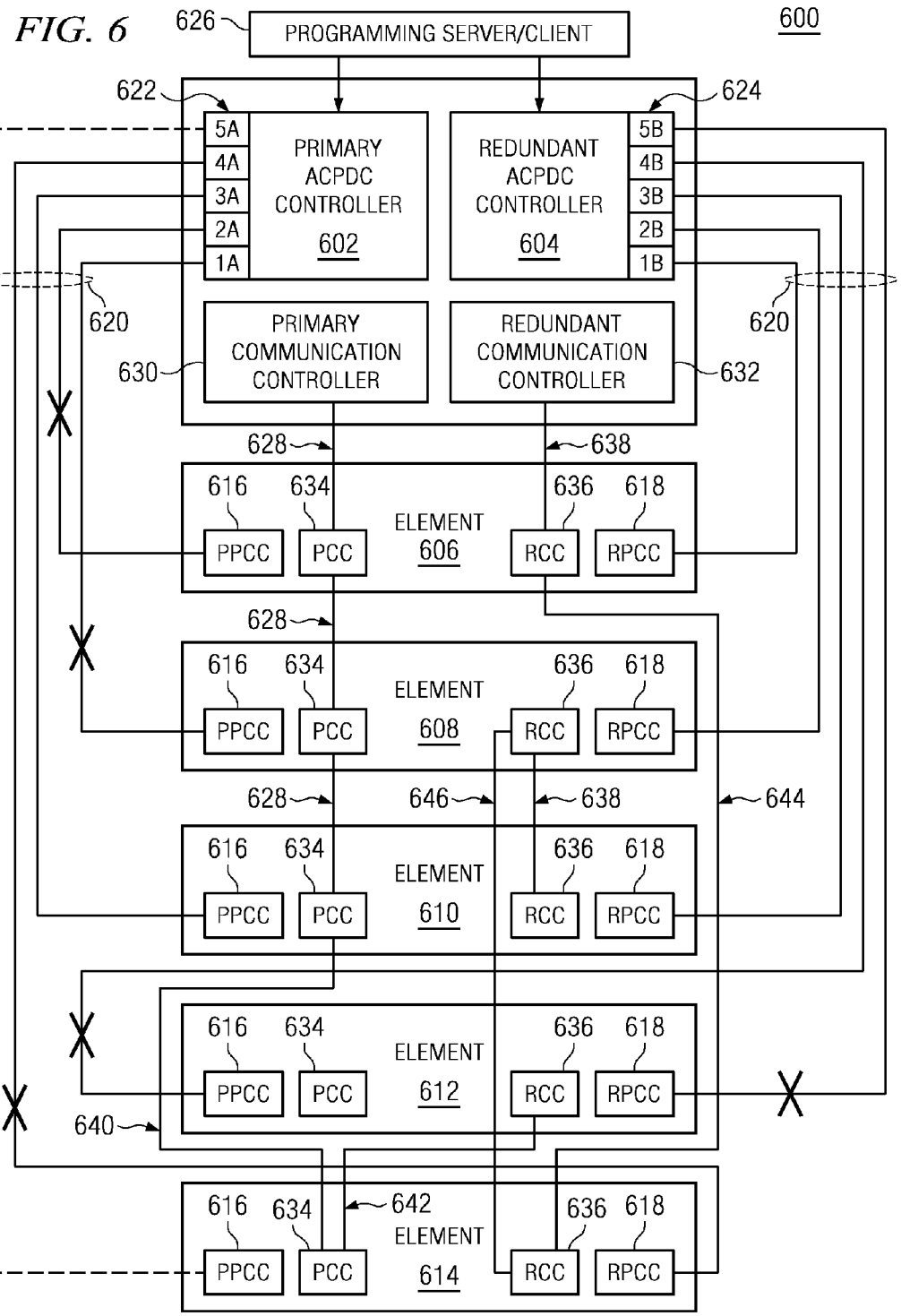
FIG. 6 depicts an exemplary configuration of powered elements that are improperly cabled within a network in accordance with an illustrative embodiment.

FIG. 6 depicts an exemplary configuration of powered elements that are improperly cabled within a network in accordance with an illustrative embodiment. Powered element configuration 600 uses primary alternating current (AC) power distribution and communication (ACPDC) controller 602 and redundant ACPDC controller 604 to provide power and data communications to powered elements 606-614. Powered element configuration 600 also includes primary communication controller 630 and redundant communication controller 632, to provide data communications to powered elements 606-614. Each of powered elements 606-614 includes primary communication connection (PCC) 634, redundant communication connection (RCC) 636, primary power and data communication connection (PPCC) 616, and redundant power and data communication connection (RPCC) 618. In this example, powered elements 606-614 are connected to primary ACPDC controller 602 and redundant ACPDC controller 604 via power and data communication links 620.

However, in this example, powered elements 606 and 608 are connected improperly to primary ACPDC controller 602. That is, powered element 606 should be connected to connection 1A of preconfigured connections 622 and powered element 608 should be connected to connection 2A of preconfigured connections 622. Additionally, powered element 614 has its RPCC 618 connected improperly and is missing its PPCC 616 connection, indicated by a dashed line. RPCC 618 of powered element 614 should be connected to connection 5B of preconfigured connections 624 and PPCC 616 of powered element 614 should be connected to connection 5A of preconfigured connections 622. Further, powered element 612 has both its PPCC 616 and RPCC 618 connected improperly. PPCC 616 of powered element 612 should be connected to connection 4A of preconfigured connections 622 and RPCC 618 should be connected to connection 4B of preconfigured connections 624.

As another example of improper cabling, powered elements 606-614 should also be interconnected together in a daisy-chain configuration using primary data communication links 628 and redundant data communication links 638, which may also be referred to as communication channels. However, as shown in FIG. 6, instead of primary data connection 640 of powered element 610 being interconnected to PCC 634 of powered element 612, primary data connection 640 interconnects PCC 634 of powered element 614 and primary data connection 642 then interconnects from PCC 634 of powered element 614 to RCC 636 of powered element 612. As shown, PCC 634 of powered element 612 is not connected to primary communications controller 630 or redundant communications controller 632. Thus, instead of powered elements 606-614 responding to a discovery message from primary communications controller 630 in an expected order of 606$p$-608$p$-610$p$-612$p$-614$p$, the powered elements will respond in an order of 606$p$-608$p$-610$p$-614$p$-612$r$.

Also in this example, instead of redundant data connection 644 of powered element 606 interconnecting to RCC 636 of powered element 608, redundant data connection 644 interconnects to RCC 636 of powered element 614 and redundant data connection 646 interconnects from RCC 636 of powered element 614 to RCC 636 of powered element 608. As shown, RCC 636 of powered element 612 is not connected to redundant communication controller 632. Thus, instead of powered elements 606-614 responding to a discovery message from redundant communication controller 632 in an expected order of 606$r$-608$r$-610$r$-612$r$-614$r$, the powered elements will respond in an order of 606$r$-614$r$-608$r$-610$r$.

In this example, in order to identify the installation of powered elements 606-614 and verify proper cabling for powered elements 606-614, the above described steps are performed. In summary, programming server/client 626 issues a discovery operation through primary communication controller 630, redundant communication controller 632, primary ACPDC controller 602, and redundant ACPDC controller 604. Primary communication controller 630, redundant communication controller 632, primary ACPDC controller 602, and redundant ACPDC controller 604 forward the discovery operation as instructions to powered elements 606-614. Powered elements 606-614 gather identification information, depending on the information requested in the discovery operation, and return the identification information as response data to programming server/client 626 through primary communication controller 630, redundant communication controller 632, primary ACPDC controller 602, and redundant ACPDC controller 604. Primary ACPDC controller 602, and redundant ACPDC controller 604 may also respond with connection information from preconfigured connections 622 and 624. FIG. 7 describes the identification of improper cabling as performed by programming server/client 626.

FIG. 7 depicts the identification of powered elements connected to a network and verification of cabling of the powered elements in accordance with an illustrative embodiment. Table 702 depicts the powered elements controlled by a primary ACPDC controller 602 and primary communication controller 630. In continuing with the example of FIG. 6, primary ACPDC controller 602 is expected to serve powered elements 606-614 connected to preconfigured connections 1A-5A, respectively. Architected connection 704 depicts preconfigured connections 622. Expected physical connection 705 depicts the expected primary power and data communication connection (PPCC) to which powered elements 606-614 should connect. Physical information 706 depicts the information received from primary ACPDC controller 602 and powered elements 606-614 in response to the discovery message sent via primary ACPDC controller 602.

Expected logical connection 707 depicts the expected primary communication connection (PCC) to which powered elements 606-614 should connect. Logical information 708 depicts the identification information received from primary communication controller 630 and powered elements 606-614 in response to the discovery message sent via primary communication controller 630. Programming server/client 626 compares the information in physical information 706, logical information 708, and architected connection 704 to identify physical cabling errors which are indicated in condition 710 and logical cabling errors which are indicated in condition 711. As with the example in FIG. 6, condition 710 indicates that preconfigured connections 622 to powered elements 606, 608, 612, and 614 are improperly cabled and/or missing. Condition 711 indicates that primary data connects 640 and 642 to powered elements 612 and 614 are improperly cabled.

Likewise, table 712 depicts the powered elements controlled by a redundant ACPDC controller 604 and redundant communications controller 632. In continuing with the example of FIG. 6, redundant ACPDC controller 604 is expected to serve powered elements 606-614 connected to preconfigured connections 1B-5B, respectively. Architected connection 714 depicts preconfigured connections 624. Expected physical connection 715 depicts the expected redundant power and data communication connection (RPCC) to which powered elements 606-614 should connect. Physical information 716 depicts the information received from redundant ACPDC controller 604 and powered elements 606-614 in response to the discovery message sent via redundant ACPDC controller 604.

Expected logical connection 717 depicts the expected redundant communication connection (RCC) to which powered elements 606-614 should connect. Logical information 718 depicts the identification information received from redundant communications controller 632 and powered elements 606-614 in response to the discovery message sent via redundant communications controller 632. Programming server/client 626 compares the information in physical information 716, logical information 718, and architected connection 714 to identify physical cabling errors which are indicated in condition 720 and logical cabling errors which are indicated in condition 721. As with the example in FIG. 6, condition 720 indicates that preconfigured connections 622 to powered elements 612 and 614 are improperly cabled and/or missing. Condition 721 indicates that primary data connects 644 and 646 to powered elements 608, 610 and 614 are improperly cabled and the primary data connection to powered element 612 is missing.

Figure 8:
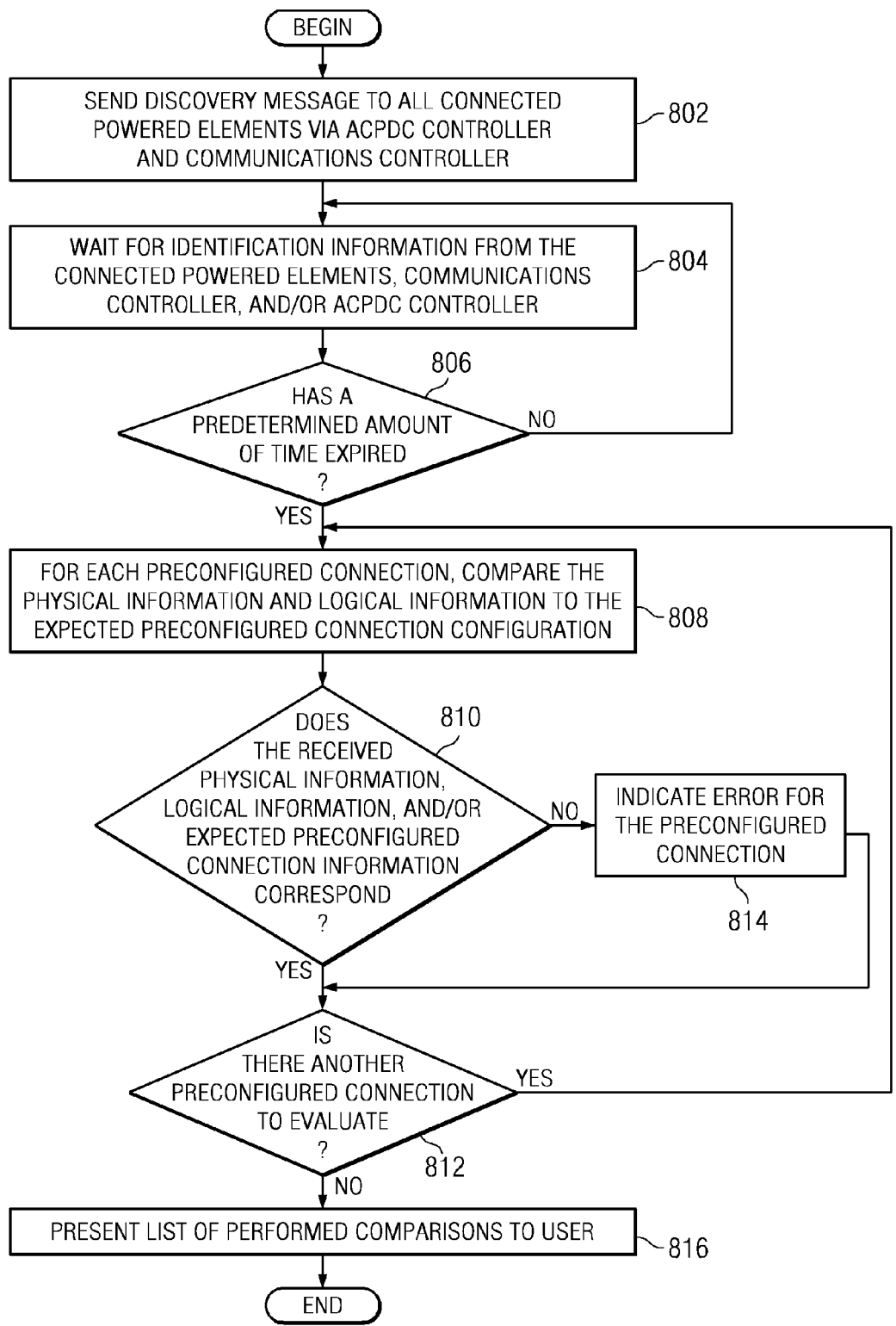
FIG. 8 is a flow diagram of the operation performed by a programming server/client in accordance with an illustrative embodiment.
Figure 9:
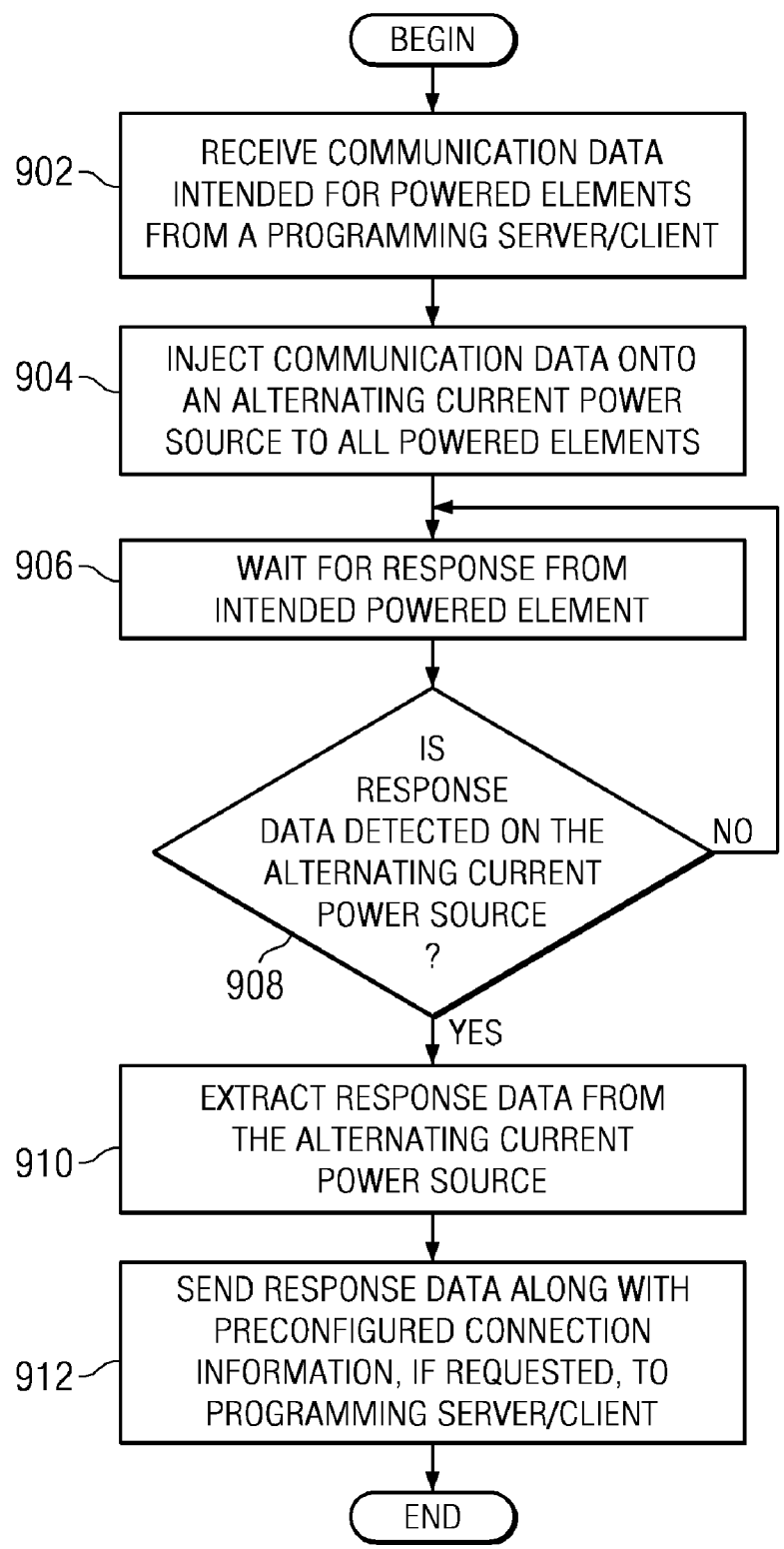
FIG. 9 is a flow diagram of the operation performed by an ACPDC controller in accordance with an illustrative embodiment.
Figure 10:
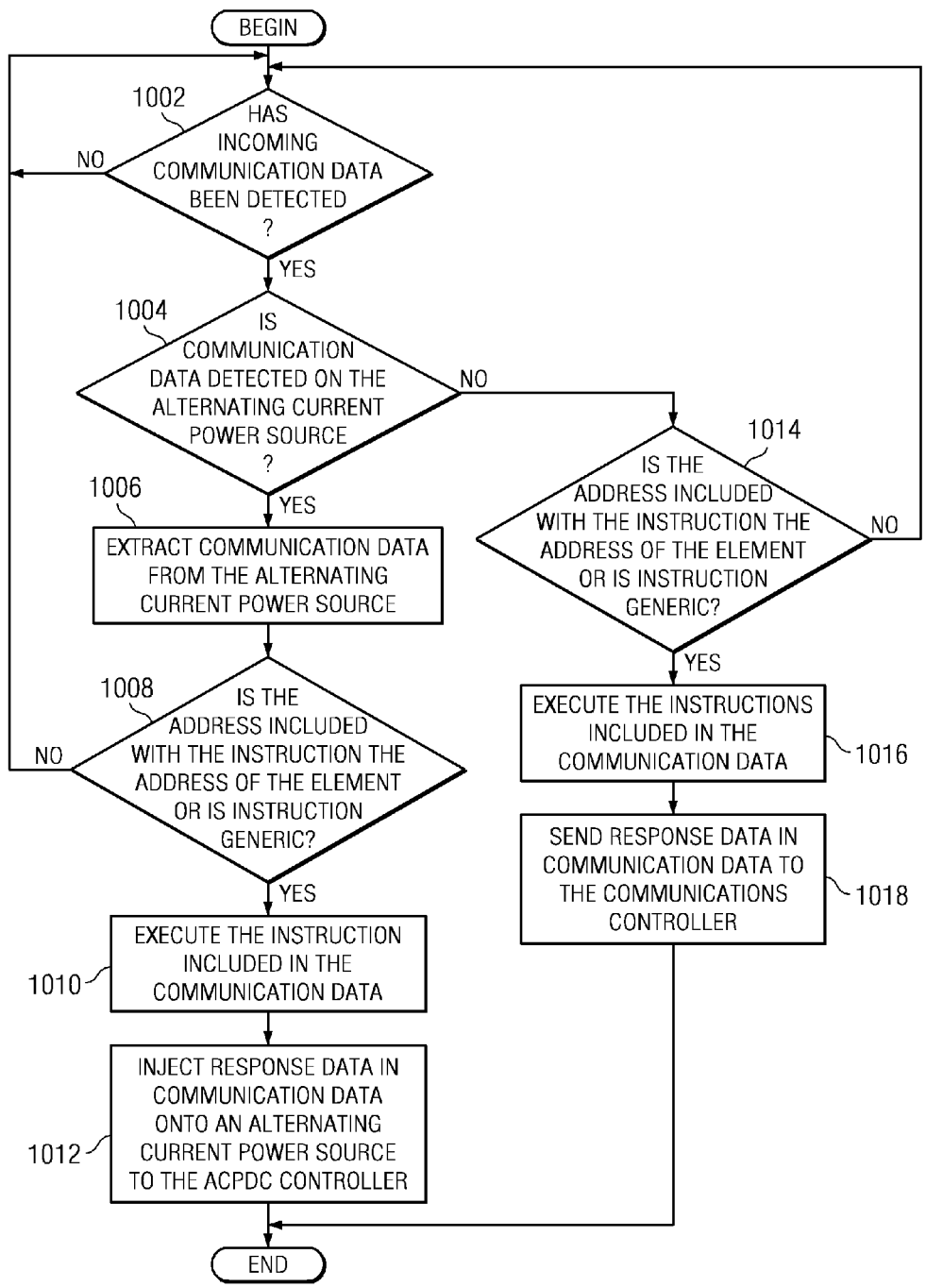
FIG. 10 is a flow diagram of the operation performed by a powered element in accordance with an illustrative embodiment.

FIGS. 8-10 are flowcharts that illustrate the identification of components connected to a data processing system and the validation that the components within the data processing system are physically and logically cabled correctly according to the illustrative embodiments. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the illustrative embodiments.

FIG. 8 is a flow diagram of the operation performed by a programming server/client in accordance with an illustrative embodiment. The following operations are performed by a programming server/client, such as programming server/client 320 of FIG. 3. As the operation begins, the programming server/client sends an instruction, such as a discovery operation, to all powered elements connected to the data processing system that the programming server/client is connected via a communications controller and an ACPDC controller (step 802). Then the programming server/client waits for response data, which may include identification information from the connected powered elements, the communications controller, and/or the ACPDC controller if the instruction was a discovery operation (step 804).

The programming server/client waits for a predetermined amount of time so that all connected powered elements may respond to the discovery message (step 806). If at step 806 the predetermined amount of time has not expired, the operation returns to step 804. If at step 806 the predetermined amount of time has expired, then for each preconfigured connection the programming server/client compares the physical and/or logical connection information received in the response data from the connected powered elements to the expected preconfigured connection configuration as the identification parameter (step 808).

The programming server/client determines for each preconfigured connection, if the physical and logical information corresponds to the expected preconfigured connection configuration (step 810). If at step 810 the information matches, the programming server/client determines if there is another preconfigured connection to evaluate (step 812). If at step 810 the information does not match, the programming server/client identifies the preconfigured connection with an error (step 814), with the operation continuing to step 812. If at step 812 there is another preconfigured connection to evaluate, the operation returns to step 808. If at step 812 there is not another preconfigured connection to evaluate, the programming server/client presents a user with a list of performed comparisons (step 816), with the operation terminating thereafter. The list of performed comparisons may be a list of only the preconfigured connections that are in error or a complete list of the preconfigured connections that indicated both the preconfigured connections that are in error and the preconfigured connections that are valid.

FIG. 9 is a flow diagram of the operation performed by an ACPDC controller in accordance with an illustrative embodiment. The following operations are performed by an ACPDC controller, such as ACPDC controller 500 of FIG. 5. The operations performed by the ACPDC controller is performed the same for both primary and redundant voltage sources and communications. As the operation begins, the ACPDC controller receives communication data intended for a powered element from a programming server/client (step 902). The communication data may include a set of instructions that are to be executed by a specific powered element or a set of powered elements. The set of instructions may be one instruction or any number of instructions. The ACPDC controller injects the communication data onto the AC power source that provides power to all connected powered elements (step 904).

The ACPDC controller then waits for response data from the powered elements in response to the powered elements executing the set of instructions that are included in the communication data (step 906). The ACPDC controller monitors the AC power source to determine if response data is detected on the AC power source that is powering the powered elements (step 908). If at step 908 the ACPDC controller fails to detect response data on the AC power source, the operation returns to step 906. If at step 908 the ACPDC controller detects response data on the AC power source, the ACPDC controller extracts the response data from the AC power source (step 910). The ACPDC sends the response data along with preconfigured connection information, if requested, to the programming server/client (step 912), with the operation ending thereafter.

FIG. 10 is a flow diagram of the operation performed by a powered element in accordance with an illustrative embodiment. The following operations are performed by a powered element, such as powered element 600 of FIG. 6. The operations performed by the powered element are performed the same for both primary and redundant voltage sources and communications. As the operation begins, the powered element monitors for incoming communication data (step 1002). If at step 1002 communication data is not detected, the operation returns to step 1002. If at step 1002 communication data is detected, the powered element determines if the communication data is coming from the incoming AC power source (step 1004). If at step 1002 the communication data is coming from the AC power source, then the powered element extracts the communication data from the AC power source (step 1006).

The powered element determines if the instruction in the extracted communication data is intended for the receiving powered element or is a generic instruction (step 1008). The powered element determines if extracted instruction is intended for the receiving powered element by looking at the address included with the instruction and comparing the address to the address of the powered element. If at step 1008 the instruction is not intended for the powered element or is not a generic instruction, the powered element ignores the instruction and the operation returns to step 1002. If at step 1008 the instruction is intended for the powered element or is a generic instruction, the powered element executes the instruction included in the communication data (step 1010). Once the powered element finishes executing the set of instructions, the powered element injects response data within communication data onto the AC power source back to the ACPDC controller (step 1012) with the operation ending thereafter.

If at step 1004 the instruction is not coming from the AC power source, then the powered element determines if the instruction in the communication data is intended for the receiving powered element or is a generic instruction (step 1014). The powered element determines if instruction is intended for the receiving powered element by looking at the address included with the instruction and comparing the address to the address of the powered element. If at step 1014 the instruction is not intended for the powered element or is not a generic instruction, the powered element ignores the instruction and the operation returns to step 1002. If at step 1014 the instruction is intended for the powered element or is a generic instruction, the powered element executes the instruction included in the communication data (step 1016). Once the powered element finishes executing the instruction, the powered element sends response data within communication data to the communications controller (step 1018) with the operation ending thereafter.

Thus, the illustrative embodiments provide mechanisms for identifying components connected to a data processing system and validating that the components within the data processing system are physically and logically cabled correctly. A programming server/client uses identification information to identify the powered elements connected to the data processing system and validate that the powered elements within the data processing system are physically and logically cabled correctly for functional interfaces. That is, each of the powered elements in the network receives the instructions via a communication connection and/or the alternating current (AC) power lines, where the powered element extracts the communication data from the AC power lines.

Whether the communication data is received via a communications controller or an alternating current (AC) power distribution and communication (ACPDC) controller, if the communication data includes an generic instruction, such as a discovery operation, the powered element executes instruction within the communication data. Once the powered element finishes executing the instruction, the powered element responds to the communications controller and/or the ACPDC controller with response data that includes logical or physical connection information depending on the information requested in the discovery operation. The programming server/client uses response data to identify the powered elements connected to the data processing system and validate that the powered elements within the data processing system are physically and logically cabled correctly for functional interfaces.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer useable storage medium having a computer readable program, wherein the computer readable program, when executed in a data processing system, causes the data processing system to:
    issue a first request for first data to a set of powered elements using a set of alternating current power lines, wherein the first request is sent as a first set of instructions injected onto the set of alternating current power lines to the set of powered elements;
    issue a second request for second data to the set of powered elements using a set of data communication links, wherein the second request is sent as a second set of instructions on the set of data communication links to the set of powered elements;
    receive the first data from the set of powered elements using the set of alternating current power lines, wherein the first data includes physical connection information for one or more alternating current power line connections for the set of powered elements;
    receive the second data from the set of powered elements using the set of data communication links, wherein the second data comprises logical connection information for one or more data communication link connections;
    determine whether each powered element in the set of powered elements is connected logically using the one or more data communication link connections and connected physically using the one or more alternating current power line connections in a predetermined configuration; and
    responsive to at least one of the one or more data communication link connections or the one or more alternating current power line connections failing to be connected in the predetermined configuration, present, to a user, a notification of each powered element in the set of powered elements that is not connected in the predetermined configuration.

2. The computer program product of claim 1, wherein the computer readable program to determine whether each powered element in the set of powered elements is connected physically using the one or more alternating current power line connections in the predetermined configuration further comprises computer readable program that causes the data processing system to:
    compare the physical connection information to an expected configuration for the one or more alternating current power line connections.

3. The computer program product of claim 1, wherein the computer readable program to determine whether each powered element in the set of powered elements is connected logically using the one or more data communication links in the predetermined configuration further comprises computer readable program that causes the data processing system to:
 compare the logical connection information to an expected configuration for the one or more data communication link connections.

4. The computer program product of claim 1, wherein the computer readable program to receive the first data using the set of alternating current power lines from the set of powered elements further includes computer readable program that causes the data processing system to:
 receive the first data on the one or more alternating current power lines;
 extract the first data from the one or more alternating current power lines;
 determine whether the first data is from a powered element in the set of powered elements; and
 responsive to the first data originating from the powered element, use the first data for analysis.

5. The computer program product of claim 1, wherein a powered element in the set of powered elements is a field replaceable unit and wherein the field replaceable unit is at least one of a computer, router, switch, modular storage element, controller, printer, disk drive module, or serial attached SCSI hard disk drive.

6. The computer program product of claim 1, wherein the set of powered elements reside within a set of equipment racks in a rack system.

7. The computer program product of claim 1, wherein the notification of each powered element in the set of powered elements that is not connected in the predetermined configuration is presented to the user using at least one of sending the notification to a printer, sending the notification to a display, automatically creating a work order that includes the notification and sending the work order to an email of a person responsible for the powered element, or providing a notification that is audible to the user.

8. A system, comprising:
 a processor; and
 a memory coupled to the processor, wherein the memory comprises instructions which, when executed by the processor, cause the processor to:
 issue a first request for first data to a set of powered elements using a set of alternating current power lines, wherein the first request is sent as a first set of instructions injected onto the set of alternating current power lines to the set of powered elements;
 issue a second request for second data to the set of powered elements using a set of data communication links, wherein the second request is sent as a second set of instructions on the set of data communication links to the set of powered elements;
 receive the first data from the set of powered elements using the set of alternating current power lines, wherein the first data includes physical connection information for one or more alternating current power line connections for the set of powered elements;
 receive the second data from the set of powered elements using the set of data communication links, wherein the second data comprises logical connection information for one or more data communication link connections;
 determine whether each powered element in the set of powered elements is connected logically using the one or more data communication link connections and connected physically using the one or more alternating current power line connections in a predetermined configuration; and
 responsive to at least one of the one or more data communication link connections or the one or more alternating current power line connections failing to be connected in the predetermined configuration, present, to a user, a notification of each powered element in the set of powered elements that is not connected in the predetermined configuration.

9. The system of claim 8, wherein the instructions to determine whether each powered element in the set of powered elements is connected physically using the one or more alternating current power line connections in the predetermined configuration further cause the processor to:
 compare the physical connection information to an expected configuration for the one or more alternating current power line connections.

10. The system of claim 8, wherein the instructions to determine whether each powered element in the set of powered elements is connected logically using the one or more data communication links in the predetermined configuration further cause the processor to:
 compare the logical connection information to an expected configuration for the one or more data communication link connections.

11. The system of claim 8, wherein the instructions to receive the first data using the set of alternating current power lines from the set of powered elements further cause the processor to:
 receive the first data on the one or more alternating current power lines;
 extract the first data from the one or more alternating current power lines;
 determine whether the first data is from a powered element in the set of powered elements; and
 responsive to the first data originating from the powered element, use the first data for analysis.

12. The system of claim 8, wherein a powered element in the set of powered elements is a field replaceable unit and wherein the field replaceable unit is at least one of a computer, router, switch, modular storage element, controller, printer, disk drive module, or serial attached SCSI hard disk drive.

13. The system of claim 8, wherein the set of powered elements reside within a set of equipment racks in a rack system.

14. The system of claim 8, wherein the notification of each powered element in the set of powered elements that is not connected in the predetermined configuration is presented to the user using at least one of sending the notification to a printer, sending the notification to a display, automatically creating a work order that includes the notification and sending the work order to an email of a person responsible for the powered element, or providing a notification that is audible to the user.

15. A method, in a data processing system, for validating a connection of powered elements within a data processing system, the method comprising:
 issuing a first request for first data to a set of powered elements using a set of alternating current power lines, wherein the first request is sent as a first set of instructions injected onto the set of alternating current power lines to the set of powered elements;
 issuing a second request for second data to the set of powered elements using a set of data communication links, wherein the second request is sent as a second set of instructions on the set of data communication links to the set of powered elements;

receiving the first data from the set of powered elements using the set of alternating current power lines, wherein the first data includes physical connection information for one or more alternating current power line connections for the set of powered elements;

receiving the second data from the set of powered elements using the set of data communication links, wherein the second data comprises logical connection information for one or more data communication link connections;

determining whether each powered element in the set of powered elements is connected logically using the one or more data communication link connections and connected physically using the one or more alternating current power line connections in a predetermined configuration; and responsive to at least one of the one or more data communication link connections or the one or more alternating current power line connections failing to be connected in the predetermined configuration, presenting, to a user, a notification of each powered element in the set of powered elements that is not connected in the predetermined configuration.

16. The method of claim 15, wherein determining whether each powered element in the set of powered elements is connected physically using the one or more alternating current power line connections in the predetermined configuration further comprises:

comparing the physical connection information to an expected configuration for the one or more alternating current power line connections.

17. The method of claim 15, wherein determining whether each powered element in the set of powered elements is connected logically using the one or more data communication links in the predetermined configuration further comprises:

comparing the logical connection information to an expected configuration for the one or more data communication link connections.

18. The method of claim 15, wherein receiving the first data using the set of alternating current power lines from the set of powered elements further comprises:

receiving the first data on the one or more alternating current power lines;

extracting the first data from the one or more alternating current power lines;

determining whether the first data is from a powered element in the set of powered elements; and responsive to the first data originating from the powered element, using the first data for analysis.

19. The method of claim 15, wherein a powered element in the set of powered elements is a field replaceable unit and wherein the field replaceable unit is at least one of a computer, router, switch, modular storage element, controller, printer, disk drive module, or serial attached SCSI hard disk drive.

20. The method of claim 15, wherein the notification of each powered element in the set of powered elements that is not connected in the predetermined configuration is presented to the user using at least one of sending the notification to a printer, sending the notification to a display, automatically creating a work order that includes the notification and sending the work order to an email of a person responsible for the powered element, or providing a notification that is audible to the user.

\* \* \* \* \*